Patented Jan. 10, 1950

UNITED STATES PATENT OFFICE 2,494,032

STYRYL DYES

Leslie G. S. Brooker and Frank L. White, Rochester, N. Y., assignors to Eastman Kodak Company, Rochester, N. Y., a corporation of New Jersey No Drawing. Application June 3, 1946, Serial No. 674,042

8 Claims. (Cl. 260—240)

This invention relates to styryl dyes containing an alkoxyl group or an aryloxyl group on the dimethine chain.

Styryl dyes, such as 2-(p-dimethylaminostyryl) pyridine ethiodide also known as Pinaflavol and having the following formula:

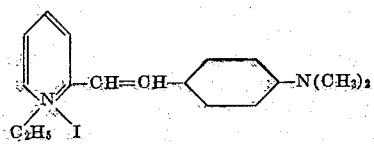

and 2 - (p - dimethylaminostyryl) benzothiazole ethiodide having the following formula:

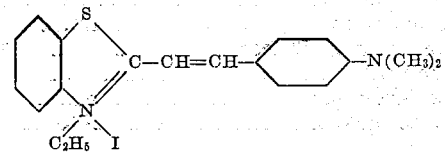

are well known, and have been used as sensitizers of photographic silver halide emulsions.

We have now found styryl dyes containing an alkoxyl or aryloxyl group on the dimethine chain. These dyes are different from the known styryl dyes not only in structure, but do not sensitize photographic silver halide emulsions appreciably.

It is an object of our invention to provide styryl dyes of a new kind. A further object is to provide a process for preparing such dyes. Other objects will become apparent hereinafter.

In accordance with our invention, we prepare our new styryl dyes by condensing a p-dialkylaminobenzaldehyde with a cyclammonium quaternary salt selected from those represented by the following formula:

I 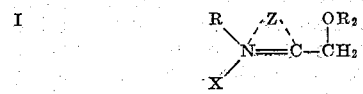

wherein R represents an alkyl group of the formula $C_nH_{2n+1}$ wherein $n$ represents a positive integer, $R_2$ represents a member selected from the group consisting of alkyl groups of the formula $C_nH_{2n+1}$ wherein $n$ represents a positive integer, aryl groups of the benzene series and aryl groups of the naphthalene series, X represents an anion, and Z represents the non-metallic atoms necessary to complete a heterocyclic nucleus selected from the group consisting of benzoxazole, benzothiazole, benzoselenazole, α-naphthoxazole, β-naphthoxazole, α-naphthothiazole and β-naphthothiazole nuclei, in the presence of a secondary amine having an ionization constant at 25° C. greater than $10^{-5}$, such as piperidine, 2-methylpiperidine, etc.

Our new dyes obtained by the foregoing condensation can be represented by the following general formula:

II 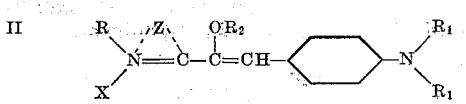

wherein R, $R_2$, X and Z have the values given above, and $R_1$ represents an alkyl group of the formula $C_nH_{2n+1}$ wherein $n$ represents a positive integer.

That our new dyes could be formed in such a condensation was not to be expected, based on the theory of styryl dye formation discussed by Mills and Raper, J. Chem. Soc. 127, 2466 (1925). According to the theory discussed by Mills and Raper, the first stage of the process involving condensation of quinaldine ethiodide and p-dimethylaminobenzaldehyde in the presence of piperidine, is the formation of a methylene base and formation of piperidine hydroiodide. This is followed by condensation of the methylene base with the p-dimethylaminobenzaldehyde to split out water and give a condensation product which reacts with the piperidine hydroiodide to give the styryl dye.

With the cyclammonium quaternary salts which we employ in practicing our invention (Formula I above) one hydrogen atom would be involved in the initial formation of the methylene base, and there would not be available two hydrogen atoms for the splitting out of water in accordance with the second step postulated by Mills and Raper. Therefore, it would be expected that our new styryl dyes could not be formed by our process, based on the theory discussed by Mills and Raper. The fact that we have been able to obtain our new styryl dyes demonstrates that a different theory must be employed in this case to account for the dye formation.

Our condensations are advantageously carried out in a solvent, e. g. an alcohol such as ethyl, n-propyl, isopropyl, n-butyl or isobutyl alcohol.

The following examples will serve to illustrate further the manner of obtaining our new dyes.

*Example 1.* — 2-(p-dimethylamino-α-phenoxystyryl)-benzothiazole methoperchlorate

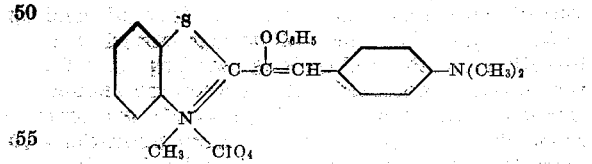

1.20 g. (1 mol.) of 2-phenoxymethylbenzothiazole and 0.93 g. (1 mol.) of methyl p-toluenesulfonate were heated together at the temperature of the steam bath for 12 hours. To this crude quaternary salt were added 0.75 g. (1 mol.) of p-dimethylamino-benzaldehyde, 10 cc. of ethyl alcohol and 6 drops of piperidine, and the reaction mixture was heated at the refluxing temperature for 4 hours. The hot mixture was treated with a hot solution of sodium perchlorate (3 g.) in water (50 cc.). The solid which separated from the chilled mixture was collected on a filter and washed with water. The residue was stirred, in a beaker, with hot ethyl alcohol and the suspension was chilled. The dye was washed on the filter with cold ethyl alcohol; the yield was 66 per cent crude and 31 per cent after two recrystallizations from methyl alcohol (340 cc. per gram of dye). The dark green crystals had a melting point of 274–286° C. with decomposition.

*Example 2. — 2-(p-dimethylamino-α-phenoxystyryl)-benzothiazole ethoperchlorate*

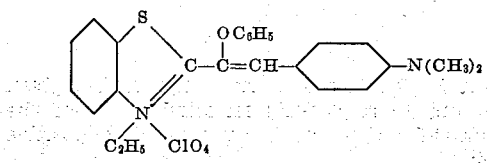

A mixture of 2.41 g. (1 mol.) of 2-phenoxymethylbenzothiazole and 2.00 g. (1 mol.) of ethyl p-toluenesulfonate were heated together at the temperature of the steam bath for about 90 hours. To this crude quaternary salt were added 1.49 g. (1 mol.) of p-dimethylaminobenzaldehyde, 10 cc. of ethyl alcohol and 11 drops of piperidine, and the reaction mixture was heated at the refluxing temperature for 4 hours. The dye was converted to the perchlorate; isolated and purified in the same manner as the styryl methoperchlorate (Example 1). The yield of dye was 47 per cent crude and 24 per cent after two recrystallizations from methyl alcohol. The dark red needles had a melting point of 254–256° C. with decomposition.

*Example 3.—2 - (p - dimethylamino - α - ethoxystyryl)-benzothiazole ethoperchlorate*

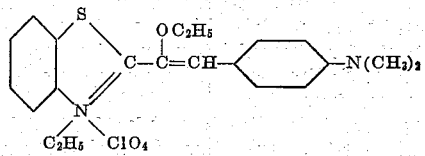

A mixture of 1.93 g. (1 mol.) of 2-ethoxymethylbenzothiazole and 2.00 g. (1 mol.) of ethyl p-toluenesulfonate were heated together at the temperature of the steam bath for about 5 days. To the crude quaternary salt were added 1.49 g. (1 mol.) of p-dimethylaminobenzaldehyde, 15 cc. of ethyl alcohol and 0.15 cc. of piperidine, and the reaction mixture was heated at the refluxing temperature for 4 hours. The hot solution was treated with a hot solution of sodium perchlorate (4 g.) in water (40 cc.). After chilling, the aqueous layer was decanted and the sticky residue was stirred with three successive portions of cold water. The remaining residue was stirred with hot ethyl acetate, and on long standing at 0° C., the solvent evaporated and a crystalline residue was obtained. The yield of dye was 13 per cent crude and 9 per cent after two recrystallizations from 95 per cent ethyl alcohol. The dark blue crystals had a melting point of 157–158° C., with decomposition.

In the manner illustrated above, 2-(p-methoxyphenoxymethyl)benzoxazole metho - p - toluenesulfonate, 2-phenoxymethyl-5-phenylbenzoxazole methomethylsulfate, 2-ethoxymethylbenzoxazole methomethylsulfate, 2-(m-toloxymethyl)benzothiazole metho-p-toluenesulfonate, 2-(p-chlorophenoxymethyl)benzothiazole metho-p-toluenesulfonate, 2-(β-naphthoxymethyl)benzothiazole metho-p-toluenesulfonate, 2-phenoxymethyl-β-naphthoxazole methomethylsulfate, 2-phenoxymethyl-α-naphthoxazole methomethylsulfate, 2 - phenoxymethyl - α - benzoselenazole methomethylsulfate, 2 - phenoxymethyl-α-naphthothiazole metho - p - toluenesulfonate and 2-phenoxymethyl - β - naphthothiazole metho - p - toluenesulfonate can be condensed with β-dimethylaminobenzaldehyde, p-diethylaminobenzaldehyde and other p-dialkylaminobenzaldehydes to give styryl dyes. As shown in the foregoing examples, equimolecular proportions of the cyclammonium quaternary salts and p-dialkylaminobenzaldehyde are satisfactory proportions to employ, and the styryl dyes are advantageously converted to their perchlorate forms to facilitate isolation of the dyes.

The hereindescribed dyes are bleached by photographic developers, such as Eastman Kodak Company's "D-76" developer, and are useful as anti-halation and filter dyes in the preparation of photographic elements. The formula for the aforesaid "D-76" developer is as follows:

| | |
|---|---|
| Water, about 125° F _____ cc__ | 750 |
| N-methyl-p-aminophenol sulfate _ grams__ | 2.0 |
| Sodium sulfite, desiccated _____ do____ | 100.0 |
| Hydroquinone _____ do____ | 5.0 |
| Borax, granular _____ do____ | 2.0 |
| Water to make _____ liter __ | 1.0 |

The heterocyclic bases and quaternary salts thereof employed herein are fully described in our copending application Serial No. 519,354, filed January 22, 1944 (now United States Patent 2,478,366, dated August 9, 1949) of which the instant application is a continuation-in-part.

What we claim as our invention and desire to be secured by Letters Patent of the United States is:

1. The styryl dyes which are represented by the following general formula:

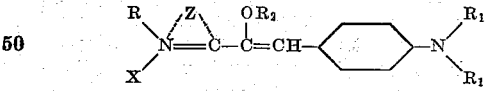

wherein R and R₁ each represents an alkyl group of the formula $C_nH_{2n+1}$ wherein $n$ represents a positive integer, R₂ represents a member selected from the group consisting of aryl groups of the benzene series and aryl groups of the naphthalene series, X represents an anion and Z represents the non-metallic atoms necessary to complete a heterocyclic nucleus selected from the group consisting of benzoxazole, benzothiazole, benzoselenazole, α-naphthoxazole, β-naphthoxazole, α-naphthothiazole and β-naphthothiazole nuclei.

2. The styryl dyes which are represented by the following general formula:

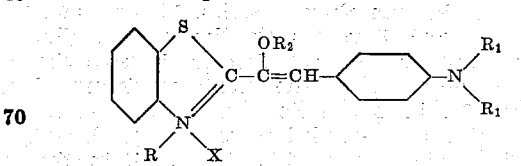

wherein R and R₁ each represents an alkyl group of the formula $C_nH_{2n+1}$ wherein $n$ represents a positive integer of from 1 to 2, R₂ represents an aryl group of the benzene series, and X represents an anion.

3. The styryl dyes which are represented by the following general formula:

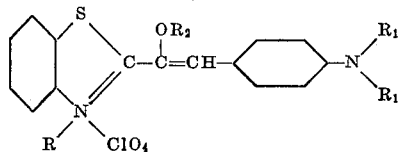

wherein R and R₁ each represents an alkyl group of the formula $C_nH_{2n+1}$ wherein $n$ represents a positive integer of from 1 to 2 and R₂ represents an aryl group of the benzene series.

4. The styryl dye which is represented by the following formula:

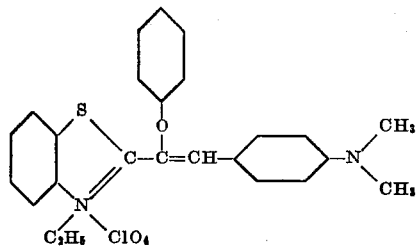

5. The styryl dye which is represented by the following formula:

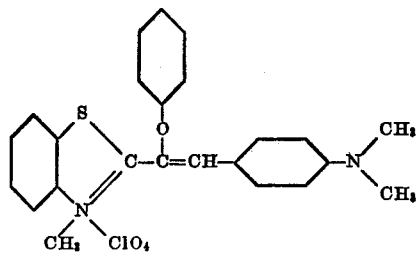

6. The process of preparing a styryl dye comprising condensing a p-dialkylaminobenzaldehyde with a cyclammonium quaternary salt selected from those represented by the following general formula:

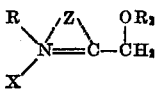

wherein R represents an alkyl group of the formula $C_nH_{2n+1}$ wherein $n$ represents a positive integer, R₂ represents a member selected from the group consisting of an aryl group of the benzene series and an aryl group of the naphthalene series, X represents an anion, and Z represents the non-metallic atoms necessary to complete a heterocyclic nucleus selected from the group consisting of benzoxazole, benzothiazole, benzoselenazole, α-naphthoxazole, β-naphthoxazole α-naphthothiazole and β-naphthothiazole nuclei, in the presence of a secondary amine having an ionization constant at 25° C. greater than $10^{-5}$.

7. The process of preparing a styryl dye comprising condensing a p-dialkylaminobenzaldehyde with a cyclammonium quaternary salt selected from those represented by the following general formula:

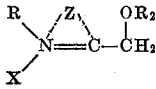

wherein R represents an alkyl group of the formula $C_nH_{2n+1}$ wherein $n$ represents a positive integer, R₂ represents a member selected from the group consisting of an aryl group of the benzene series and an aryl group of the naphthalene series, X represents an anion, and Z represents the non-metallic atoms necessary to complete a heterocyclic nucleus selected from the group consisting of benzoxazole, benzothiazole, benzoselenazole, α-naphthoxazole, β-naphthoxazole, α-naphthothiazole and β-naphthothiazole nuclei, in the presence of piperidine.

8. The process of preparing a styryl dye comprising condensing a p-dialkylaminobenzaldehyde in which the alkyl groups are alkyl groups of the formula $C_nH_{2n+1}$ wherein $n$ represents a positive integer of from 1 to 2, with a cyclammonium quaternary salt selected from those represented by the following formula:

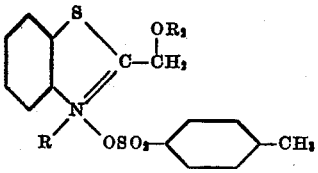

wherein R represents an alkyl group of the formula $C_nH_{2n+1}$ wherein $n$ represents a positive integer of from 1 to 2, and R₂ represents an aryl group of the benzene series, in the presence of piperidine, adding an alkali metal perchlorate to the resulting mixture and isolating the resulting styryl perchlorate from the reaction mixture.

LESLIE G. S. BROOKER.
FRANK L. WHITE.

REFERENCES CITED

The following references are of record in the file of this patent:

UNITED STATES PATENTS

| Number | Name | Date |
|---|---|---|
| 2,060,023 | Brooker | Nov. 10, 1936 |
| 2,083,804 | Zeh | June 15, 1937 |
| 2,156,464 | Schulz | May 2, 1939 |
| 2,292,021 | Walter | Aug. 4, 1942 |
| 2,393,743 | Brooker | Jan. 29, 1946 |